United States Patent [19]

Adams, Jr. et al.

[11] Patent Number: 4,896,369
[45] Date of Patent: Jan. 23, 1990

[54] OPTIMAL SATELLITE TWT POWER ALLOCATION PROCESS FOR ACHIEVING REQUESTED AVAILABILITY AND MAINTAINING STABILITY IN ALPC-TYPE NETWORKS

[75] Inventors: William C. Adams, Jr., Indialantic; Charles R. Patisaul, Melbourne; Gerald S. Duggan, Indialantic, all of Fla.

[73] Assignee: Harris Corporation, Melbourne, Fla.

[21] Appl. No.: 687,269

[22] Filed: Dec. 28, 1984

[51] Int. Cl.$^4$ .................... H04B 7/185; H04B 1/60
[52] U.S. Cl. ................................. 455/12; 455/10; 455/52
[58] Field of Search .............. 455/10, 12, 40, 52, 455/69

[56] References Cited

U.S. PATENT DOCUMENTS

| | | | |
|---|---|---|---|
| 4,287,598 | 9/1981 | Langseth et al. | 455/10 |
| 4,301,533 | 11/1981 | Acampora et al. | 455/10 |
| 4,309,764 | 1/1982 | Acampora | 455/12 |

Primary Examiner—Jin F. Ng
Assistant Examiner—Curtis Kuntz
Attorney, Agent, or Firm—Antonelli, Terry & Wands

[57] ABSTRACT

The possibility of overload (saturation-lockup) condition of an ALPC satellite communication network is avoided by a scheme that grants network entry (allocates TWT power) to each link one at a time. As each link is granted entry into the network, the corresponding TWT probability density function is computed and then integrated to obtain a TWT cumulative distribution function. The required rain margin $M_r$ for a specified availability is determined from the cumulative margin. The computed margin $M_r$ is set equal to the initial satellite TWT operating point change (multiplicative factor) $MR_1$ due to rain fade, $MF_1 = M_r$ to ensure that network stability considerations and rain fades equally constrain network performance. This result is then used to compute the value of the corresponding multiplicative factor $MF_2$. These two factors, when expressed in decibels, may be added to the nominal (no rain) TWT operating point (also expressed in decibel notation) to predict the maximum TWT operating point value in response to rain stress at the specified system availability. This predicted maximum TWT operating point is then compared to the analytically determined value of the TWT stability point. If the TWT stability point is not exceeded for the current number of links then an additional link may be added, otherwise, the last link requesting entry into the network is denied access. After the maximum permissible number of terminals has been accommodated, the final actual values of TWT stability point, stability margin, and link availability are computed and the allocation process is terminated.

15 Claims, 6 Drawing Sheets

OPTIMAL SATELLITE TWT POWER ALLOCATION PROCESS FOR ACHIEVING REQUESTED AVAILABILITY AND MAINTAINING STABILITY IN ALPC-TYPE NETWORKS

The United States Government has rights with respect to the invention disclosed and claimed in the present application under Contract No. RTACS JA 1010-5412-01.

FIELD OF THE INVENTION

The present invention relates to sat systems and is particularly directed to a scheme for controlling the allocation of power and the entry of links into a satellite communications network so as to maintain link participation and power availability at an optimum level irrespective of transmission interference (e.g. rain fade) and user demand conditions.

BACKGROUND OF THE INVENTION

As communication networks have continued to expand and diversify to meet the needs of a variety of subscriber/users, the continued successful operation of relay satellites, which constitute a critical component of each network link, has continued to draw increasing attention, especially with respect to the matter of power allocation among the links. In order for any relay link to operate successfully over a variety of link conditions, i.e. to accommodate changing levels of signal attenuation caused, for example, by rainfall between the relay satellite and the earth station, the satellite TWT power allocated to each downlink terminal is tailored to provide a prescribed degree of excess power (rain fade margin). Typically, this power differential may be on the order of 6 dB higher than that required to close the link in clear weather. Because heavy rainfall is infrequent and all terminals do not experience rainfall simultaneously, this rain fade margin is wasted most of the time.

In an effort to circumvent this highly inefficient allocation of effectively unused excess power, adaptive link power control (ALPC) schemes such as described in U.S. Pat. Nos. 4,261,054 to Scharla-Nielsen and 4,228,538 to Scharla-Nielsen et al and assigned to the Assignee of the present application, have been proposed. In an ALPC satellite network, each link monitors its received signal quality and sends appropriate power control commands to the transmitter terminal in an attempt to maintain desired link performance during rain fades. In response to these power control commands the uplink transmitter causes power to be drawn from a common or shared power pool that is normally held in reserve in the satellite TWT until it is actually required by individual downlinks. Because of the statistical nature of the occurrence and intensity of rain fades, the size of this power pool o rain margin in the TWT is considerably less than the above-referenced 6 dB figure, so that the satellite network can support more terminals and/or higher data throughput. (For a description of additional examples of schemes for circumventing the problem of rain fades attention may be directed to the U.S. Pat. No. 3,667,043, to Ahlgren, Arens et al U.S. Pat. No. 4,004,224, Welti U.S. Pat. No. 3,917,998, Thomas U.S. Pat. No. 4,038,600, Acampora U.S. Pat. No. 4,309,764, Acampora et al 4,301,533 and Mori 3,676,778.)

Now although the ALPC approach offers a reduction in wasted power and thereby an improvement in throughput capacity, it subjects the network to a potential "lockup" condition, in which the satellite TWT intermodulation product power received by a terminal can become comparable to the terminal's internally generated thermal noise. In this event, successive ALPC cycles drive the TWT into saturation, after which all network links exhibit unsatisfactory performance due to excessive intermodulation product power generated in the satellite TWT.

SUMMARY OF THE INVENTION

In accordance with the present invention the potential overload (saturation-lockup) condition of the conventional ALPC approach is avoided by a scheme that grants network entry (allocates TWT power) to each terminal one at a time. As each terminal is granted conditional entry into the network, the corresponding TW probability density function is computed and then integrated to obtain a TWT cumulative distribution function. The required rain margin $M_r$ for a specified availability is determined from the cumulative margin. The rain margin $M_r$ is set equal to the ALPC network stability margin $NSM_r$ to ensure that both margins equally constrain network performance. A control factor, termed output backoff (OBO), necessary in order to achieve this stability margin is computed by evaluating an analytical expression for signal-to-intermodulation noise ratio $(S/I)_0$ as a function of the link signal-to-noise ratio (defined in terms of a bit rate bandwidth $(E_b/N_0)$) and stability margin $NSM_r$ and then relating this result to output backoff. A comparison of the actual OBO for the current cumulative number of terminals to the output backoff required to ensure continued ALPC network stability will govern whether an additional terminal can be added, or whether the current terminal that has requested entry into the network must be "peeled off". After the maximum permissible number of terminals has been accommodated, the TWT stability point and actual stability margin and link availability are computed and the allocation process is terminated.

DETAILED DESCRIPTION

Figure 1:
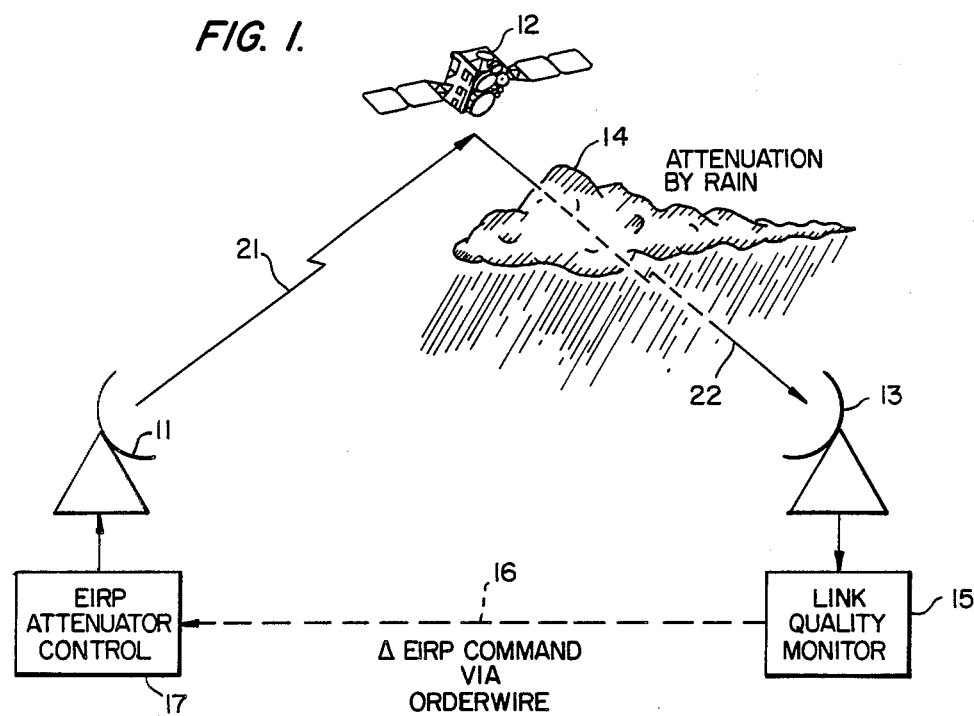
FIG. 1 is a diagram of a portion of a satellite communication network.

In order to facilitate an understanding of the optimal power allocation process of the present invention, it is useful to consider, initially, the composition and operation of an ALPC Network. Typically an ALPC network contains multiple earth stations that communicate with one another over multiple satellite links via a commonly shared satellite transponder, the links themselves having arbitrary connectivity. A portion (i.e. one link) of such a network is illustrated diagrammatically in FIG. 1 as containing an uplink or transmitter terminal 11 that communicates with a downlink terminal 13 via a satellite transponder 12. The communication link thus consists of an uplink channel 21 connecting transmitter terminal 11 and satellite transponder 12 and a downlink channel 22 connecting satellite transponder 12 and terminal 13. Downlink terminal 13 is coupled with a link quality monitor unit 15 which monitors the quality of signals received over downlink channel 22. On the basis of the measure of signal quality, a control signal is coupled from downlink terminal 13 over an orderwire link 16, separate from the satellite link to an EIRP attenuator control unit 17 at transmitter terminal 11, for adjusting periodically the level of the signal power transmitted from uplink terminal 11, in an effort to maintain downlink received signal quality at a prescribed level.

A source of significant degradation of such signal quality is a rain fade represented in FIG. 1 by rain attenuation 14 in downlink channel 22. The presence of the rain attenuation will cause the signal quality measured at downlink terminal 13 to drop substantially from a prescribed acceptable level, whereby a command is transmitted from terminal monitor unit 15 over orderwire link 16 to control unit 17, instructing transmitter terminal 11 to increase its radiated signal power over channel 21 to satellite transponder 12. This action is illustrated in FIGS. 2–4 which show the manner in which an increase in radiated signal power from the travelling wave tube within the satellite transponder 12 is accompanied by an increase in the intermodulation products power I.

Figure 2:
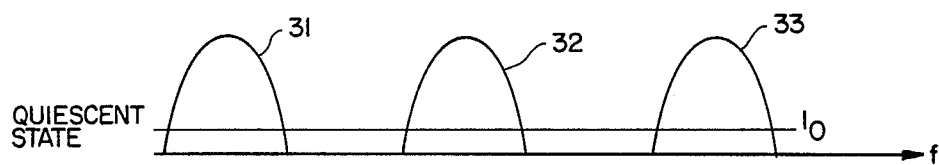
FIGS. 2–4 show respective radiated power characteristics of a satellite transponder TWT over a prescribed bandwidth.

Referring to FIG. 2, the signal power characteristic for the traveling wave tube is shown as containing a plurality of (spaced apart in frequency) signal power characteristics 31, 32 and 33, respectively associated with separate communication channels, such as downlink channel 22 from satellite transponder 12 to downlink terminal 13, illustrated in FIG. 1, referenced above. For purposes of the present discussion, signal characteristic 32 is assumed to correspond to downlink channel 22. Within the transponder, an intermodulation product noise level $I_0$ (which will be described in detail below) is shown as superimposed on the radiated signal power characteristic.

Figure 3:
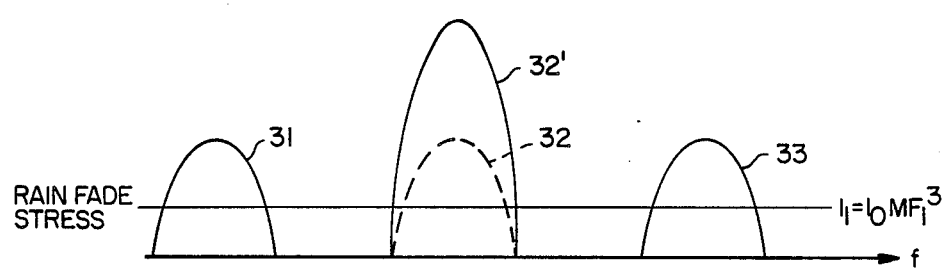
Figure 4:
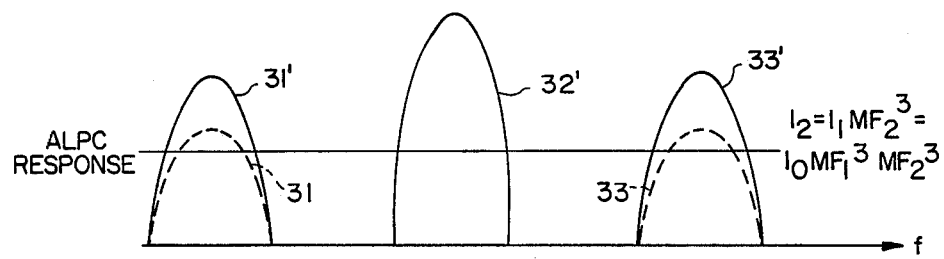

As explained above, in response to a rain attenuation stress, transmitter terminal 12 sends a signal over uplink channel 21 causing the TWT within the satellite transponder 12 to increase the downlink power over channel 22, thereby increasing the signal output characteristic 32 of the TWT from that shown in FIG. 2 to new characteristic 32', shown in FIG. 3. However, the resulting increase in the TWT operating point, in turn, causes a higher intermodulation product power level $I_1$ for all links and initiates a signal degradation (rain attenuation) response cycle.

Figure 5:
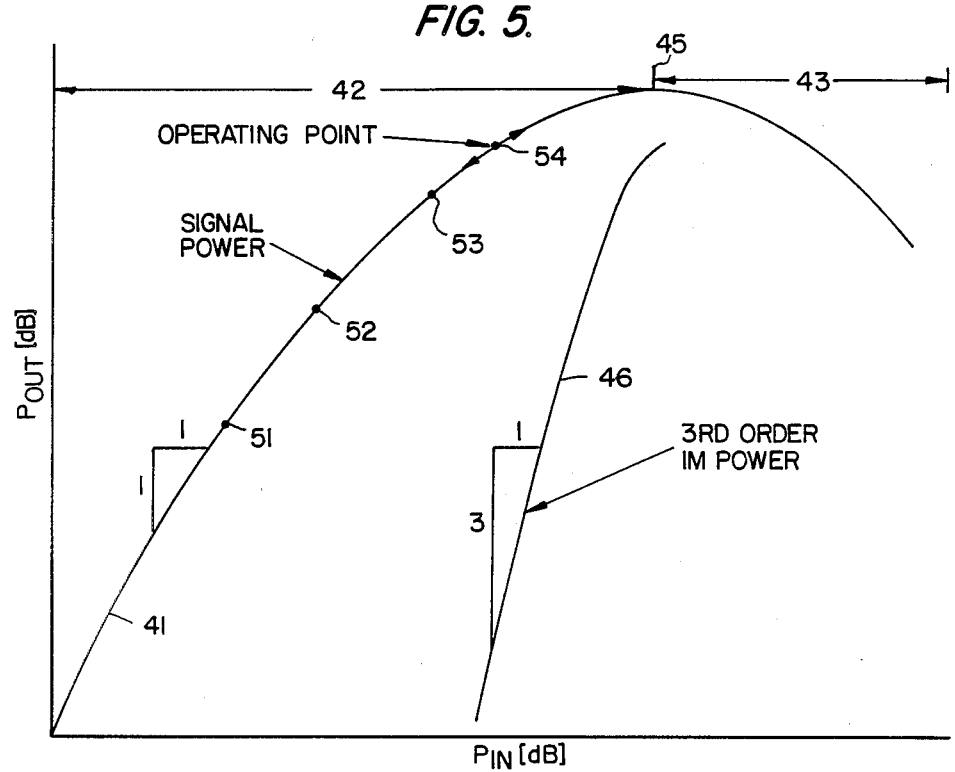
FIG. 5 shows the power output vs. power input characteristic of a satellite transponder TWT.

More particularly, with attention directed to FIG. 5, there is shown the power output vs. power input characteristic 41 of the travelling wave tube within the satellite transponder 12. Also shown is the third order intermodulation product characteristic 46 which has positive slope (3:1) region 46 considerably greater than that (1:1) of power characteristic 41. As shown in FIG. 5, characteristic 41 is nonlinear, increasing with a positive slope during a first region 42 and thereafter from a peak level 45, decreasing over a region 43. As noted above, for lower values of input power, the output vs. input characteristic 41 has approximately a 1:1 slope. In the event of a stress on one or more of the links (e.g. a rain fade attenuation on link 22 shown in FIG. 1), the transponder TWT output power will increase by a multiplicative factor MF to counteract the effect of the rain fade. This is considered to be a stress portion of a cycle of action to be taken by the system, since it is initiated by a rain fade stress.

Because part of the power generated within the travelling wave tube is embedded in intermodulation products, not only is there an increase in the radiated signal power, but there is an increase in the intermodulation product power level, represented by power characteristic 46. This is represented in FIG. 3, referenced above, by IM power level $I_1$, responding to the rain fade stress. As shown in FIG. 5, from an initial operating point 51, the signal output power of the travelling wave tube, in response to a rain fade stress, increases to a new level 52. The increase in power level causes an increase in the signal power transmitted over link 22 to counteract the effect of the rain fade attenuation 14, so that the signal characteristic over link 22 changes from characteristic 32 to 32', as shown in FIG. 2. As far as terminal station 13 is concerned, accordingly, a satisfactory increase in signal power has been initiated so as to counter the effect of the rain fade and terminal station 13 is now satisfied. However, when the transponder TWT was caused to increase its signal power output, there was a resulting increase in intermodulation product power level, as mentioned above. This increase in intermodulation product power level, which affects all of the other links in the network, does not affect the received signal power of link 22.

More particularly, the downlink fade 14 which affected the received signal power at terminal station 13 also has attenuated the received intermodulation product power level $I_1$. As a result, the signal-to-noise ratio at terminal station 13 is still at an acceptable level.

For all other links on the network, however, the increase in intermodulation product power level has caused a decrease in the signal-to-effective noise ratio at the respective receiver terminal stations Accordingly, other receiver terminal stations will initiate an adaptive link power control action causing their respective transmitters to take steps to increase the radiated signal power from the transponder TWT. This increase in signal power level for the other links is shown in FIG. 4 by the respective increases in signal characteristics 31 and 33 to 31' and 33', respectively. In FIG. 5, the corresponding increase in TWT power level is shown as a change in power level from operating point 52 to operating point 53. This increase in operating point level causes an increase in the radiated signal power for the affected link by some amount $\Delta$ to compensate for the fade stress $\Delta' = \Delta$. Accordingly, the resulting signal-to-effective noise ratio value at terminal 13 is approximately the same as prior to the fade, but the signal to intermodulation product power level value is larger by about $\Delta$. (Recall that effective noise is the sum of thermal noise and intermodulation product power.) It can be seen, therefore, that increases in the radiated intermodulation product power noise density affect the rain faded link 22 to a much smaller extent than the other links. The values of $\Delta$ and $\Delta'$ are not quite equal to each other since the improved value of signal to intermodulation product power level implies that the signal-to-thermal noise ratio need not be quite as large as prior to the fade in order to achieve a required value of signal to (noise plus intermodulation product) ratio.

Within the travelling wave tube of the satellite transponder 12, however, the output operating point has moved closer to saturation level 45. With the increase in the intermodulation product power level to the new level $I_2$, all of the links of the network will detect a decrease in the signal-to-noise ratio level and again initiate an adaptive link power control response cycle to cause the operating point to shift to a new point 54. This action continues to take place repeatedly in a domino type effect until eventually the transponder TWT amplifier reaches an instability or lockup point 45, whereby any further attempts to increase signal power actually cause a decrease in the signal power within region 43.

Summarizing the above, for operating points sufficiently close to saturation level 45, increasing the output power yields a worse performance for each signal received over any link in the network, since the intermodulation product power increases faster than the signal power. Thus, for every 1 dB increase of operating point, the signal-to-thermal noise ratio (S/N) improves 1 dB, but the signal-to-intermodulation noise ratio (S/I) becomes worse by 2 dB. The result is that the effective signal-to-noise ratio degrades if the intermodulation product power noise level is comparable to the thermal noise level at the receiving terminal. When this occurs, all links request more power and the system races to a lockup condition.

Figure 6:
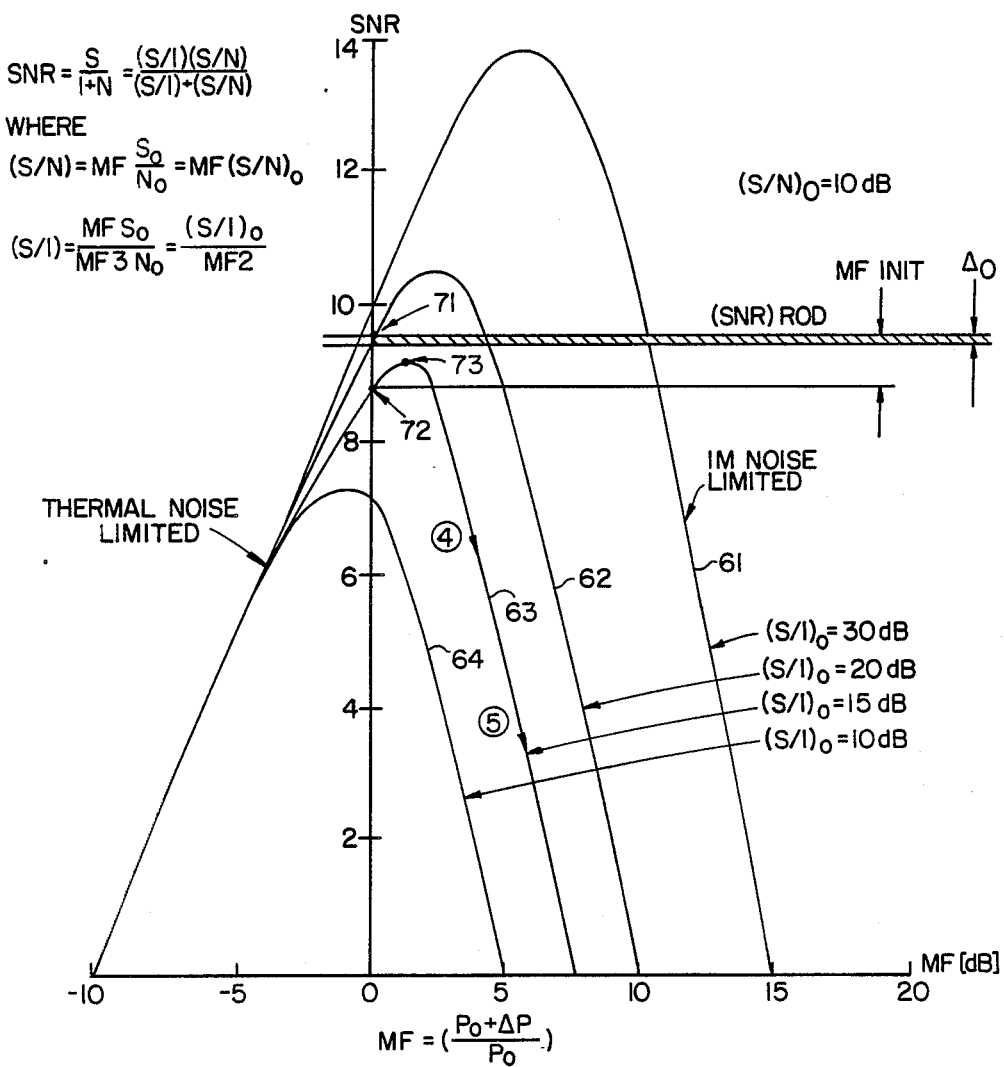
FIG. 6 shows a family of curves depicting the relationship between TWT signal-to-effective noise ratio and multiplication factor where effective noise is the sum of thermal noise and intermodulation product power.

Another way of considering the above sequence of events is to examine how the "effective" signal-to-noise ratio will change with variations in the operating point along curve 41 relative to the initial operating point P0, identified in FIG. 5 as operating point 51. Specifically, FIG. 6 illustrates a series of characteristic curves 61, 62, 63 and 64 of the relationship between the effective signal-to-noise ratio, hereafter referred to as SNR and changes in operating point MF. Each of curves 61–64 may be defined by the expression for signal-to-noise ratio, specifically:

$$SNR = S/(I+N) = (S/I)\cdot(S/N)/((S/I)+(S/N)) = ((S/I)_0 \cdot (S/N)_0 \cdot MF/((S/I)_0 + (S/N)_0 \, MF),$$

where $$(S/I) = MFS_0/MF^3 N_0 = (S/I)_0/MF^2$$

$$(S/N) = MFS_0/N_0 = MF\,(S/N)_0,$$

$$MF \triangleq (P_0 + \Delta P)/P_0.$$

In the above equations, the "0" subscript denotes initial values (here at operating point P0 (or point 51 in FIG. 5), namely those values prior to an increase in the transponder TWT output power.

The value for MF for which maximum to signal-to-noise ratio occurs (MF max) is found, through differentiation, to be:

$$MF_{max} = ((S/I)_0/2(S/N)_0)^{\frac{1}{3}}.$$

Substitution of this maximum result into the expression for signal-to-noise ratio shows that the maximum signal-to-noise ratio value ($SNR_{max}$) is defined by the expression:

$$SNR_{max} = (2(S/N)_0)^{\frac{2}{3}}((S/I)_0)^{\frac{1}{3}}/3.$$

In terms of the above described adaptive link power control stress/response cycle illustrated in FIGS. 2–4, consider the manner in which the signal-to-noise ratio versus multiplication factor MF characteristic decreases in the manner shown in FIG. 6. Prior to the occurrence of a rain fade, let it be assumed that the signal-to-thermal noise ratio $(S/N)_0$ is 10 dB and the signal to intermodulation product power ratio $(S/I)_0$ is 20 dB, yielding an effective signal-to-noise ratio SNR of 9.6 dB as represented by point 72 of curve 62. If only one of the links (here downlink 22) suffers a rain fade stress, the adaptive link power control operation will increase the transponder TWT output power by some multiplication factor amount $MF_{init}$, thereby decreasing the signal to intermodulation product noise value for all of the links, as described above. This has effect of moving the operating point from point 71 to point 72 along the SNR axis, as shown in FIG. 6. Point 72 lies on curve 63 corresponding to a new (S/I) value that exists after the adaptive link power control cycle has increased the TWT power by $MF_{init}$ to combat the effect of the rain fade stress. Since, however, the new SNR value at point 72 is too small, the adaptive link power control response cycle is activated and the new operating point is increased even further (by MF) in an attempt to overcome the inadequacy of the signal-to-noise ratio shortfall. This results in the operating point moving from point 72 to point 73 along curve 63. The operating point 73, however, is at the saturation point of curve 63. Subsequent attempts to improve the signal-to-noise ratio cause the operation point to move to point 74 along curve 63 and so on, as the multiplication factor MF increases. In general, depending upon the magnitude $MF_{init}$ and the initial conditions of $(S/N)_0$ and $(S/I)_0$, the response cycle may go through several iterations and may or may not be successful in restoring the required signal-to-noise ratio value at $(SNR)_{rqd}$.

It should be observed that the cumulative MF value is the product (or sum, if MF is measured in dBs) of the intermediate MF values during the response cycle. If adequate signal-to-noise ratio cannot be restored through the adaptive link power control response cycle, then TWT saturation or system lockup will occur.

Figure 7:
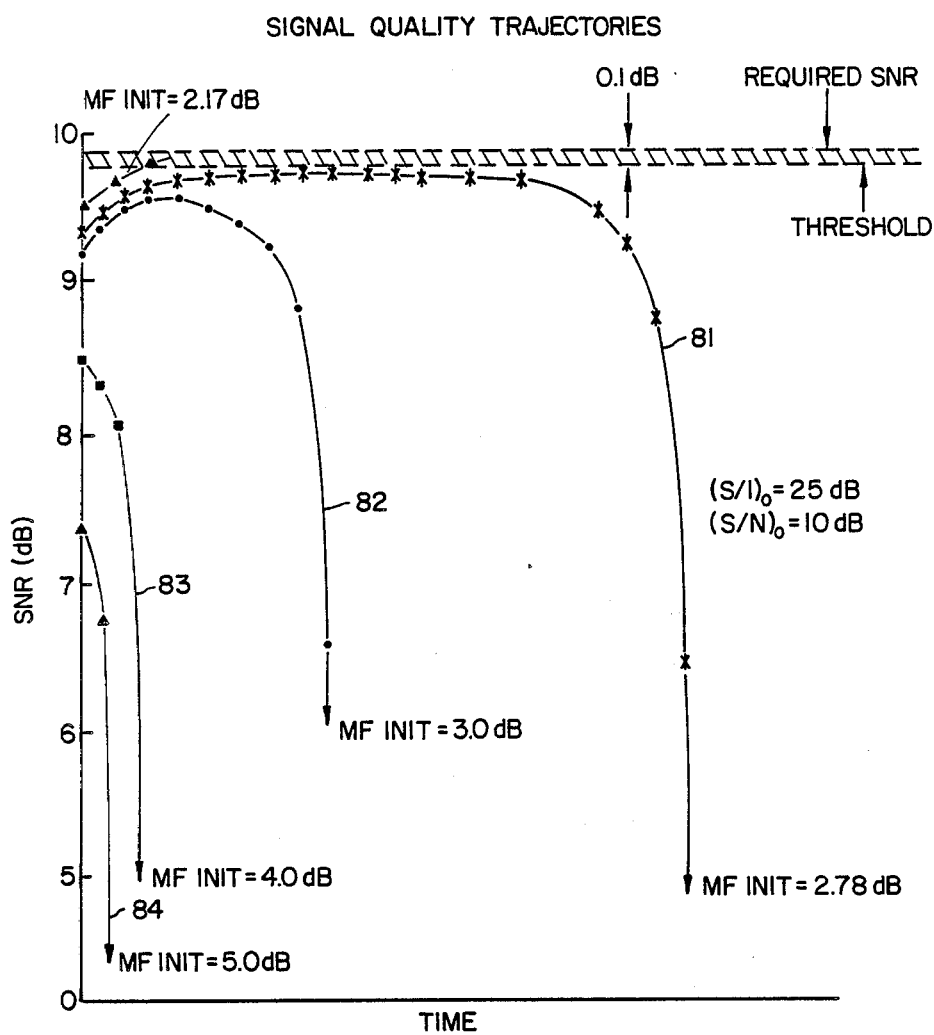
FIG. 7 shows a family of TWT signal quality trajectories representative of variation of TWT signal-to-effective noise ratio with time.

Another way of considering the ALPC response cycle procedure is to examine the signal quality SNR as a function of time during the response cycle. FIG. 7 illustrates an example of signal quality trajectories (SNR vs. time). These trajectories 81–84 show the manner in which the signal-to-noise ratio changes for each ALPC command time in response to a single initial increment $MF_{init}$ to the TWT operating point. The indicated points (*,·,□,△ on curves 81–84) designate successive command times. As can be seen from FIG. 7, initial increments that are larger than a critical value ($MF_{init} > MF_{critical}$) lead to system instability or lockup.

Curves 81–84 are similar to curves 61–64 in FIG. 6 except that the X axis is time rather than dB.

Having examined the above ALPC stress/response cycle and the instability mechanism that occurs in the transponder TWT, two network stability criteria may be defined. Given an initial ALPC response $MF_{init}$, then for a rain fade stress, the satellite communication network will not lock up if and only if two conditions are satisfied. The first is that the maximum value of the "new" signal-to-noise ratio curve must exceed the required signal-to-noise ratio value minus the width of the dead zone $\Delta Q$ in the quantizer of the analog-to-digital converter contained within the signal quality monitoring unit 15 at the downlink station 13. Namely, $SNR_{max} > SNR_{rqd} - \Delta Q$. second is that the maximum value of SNR occurs at a position to the right (as viewed in FIG. 6) of the initial operating point 71 on curve 62.

Using these two criteria, expressions for maximum permissible value of $MF_{init}$ and the corresponding response MF, herein after referred to as $MF_1$ and $MF_2$, may be derived.

In considering network stability, the above discussion has described the so called "lockup" phenomenon in which downlink terminals continue to ask for more power which is unavailable and the TWT saturates. This is a result of the intermodulation products that are generated in the traveling wave tube of the satellite transponder and is not affected by the order of the feedback loop.

The other type of instability is the "oscillatory" phenomenon that occurs in feedback systems when a new correction signal is generated and then put into use before the effects of the prior correction signal have been felt. In order to prevent this "oscllatory" type of network instability from occurring, the interval between ALPC commands must exceed the ALPC control loop response time. In practice, the ALPC control loop response time cannot be decreased much below one second because two round trip signalling excursions through a satellite (geosynchronous) are required and some processing (smoothing) time is necessary to obtain an accurate estimate of the received link signal quality at signal quality monitor unit 15 at the downlink station. On the other hand, the maximum magnitude of a commanded power change to the transmitter station must be sufficient to combat fade rates on the order of 0.1 db/second for rain fades. Other types of fades, such as scintillation fades, have a greater fade rate (1 dB/second) and therefore the maximum commandable change should exceed 1 dB. The result is that the TWT operating point can change from its nominal value to a saturated value (lockup) within a matter of a few seconds.

Prior to describing control criteria upon which the present invention operates, some notations and definitions will be defined. Within the travelling wave tube of the satellite transponder 12, the total signal power required ($P_{tot}$ in watts) output at any time is the sum of the individual downlink power requirements $P_i$, $i=1 \ldots N$. The probability density function (PDF) of required TWT power for each communication link is a function of the terminal location, antenna elevation and rainfall characteristics at that terminal location. The PDF of the required TWT power for each link is composed of a discrete, impulsive portion corresponding to the probability of no rain and a smooth, continuous portion corresponding to link power requirements during rain fades.

Figure 8:
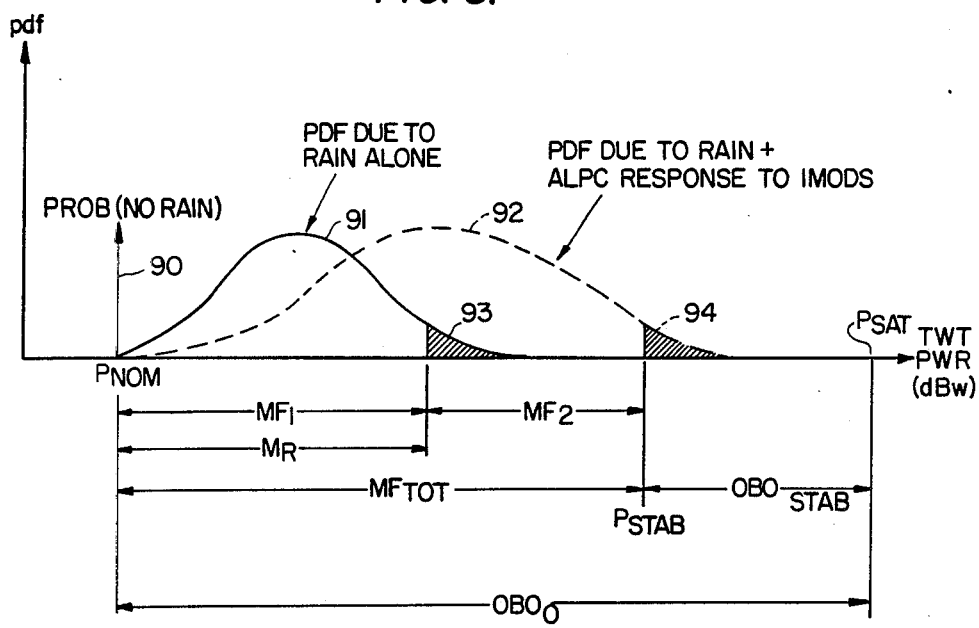
FIG. 8 shows the variation of probability density function with TWT power for respective operating conditions of no rain, rain fade and rain fade+ALPC response.

FIG. 8 shows a set of probability density functions 90, 91 and 92 for variations in TWT output power. Along the abscissa, point $P_{nom}$ corresponds to the nominal satellite TWT power in the absence of rain fade (namely for clear weather).

$P_{stab}$ corresponds to the TWT stability point beyond which point TWT saturation is inevitable unless some prescribed network control takes place.

OBO corresponds to the satellite TWT output backoff value defined with respect to TWT saturation value.

$P_{sat}$ corresponds to the satellite TWT saturated output value.

$OBO_{stab}$ corresponds to the satellite TWT output backoff (OBO) value corresponding to the stability point.

$M_R$ corresponds to the rain margin allocated to combat rain fades.

$MF_1$ is the initial satellite TWT operating point change (multiplicative factor) due to a system stress (rain fade) alone (ALPC network stability margin).

$MF_2$ corresponds to additional satellite TWT operating point (multiplicative factor) change due to ALPC compensation of increased intermodulation product power levels resulting from $MF_1$.

$MF_{tot}$ is equal to the product of $MF_1$ and $MF_2$ or the sum of $MF_1$ in dB and $MF_2$ in dB.

$\hat{MF}_1$ is the maximum permissible value of $MF_1$ that does not lead to system lockup.

$\hat{MF}_2$ is the value of ALPC TWT response to maximum permissible $MF_1$ value, $\hat{MF}_1$.

$E_s/N_o$ is the link signal-to-noise ratio defined in the symbol rate bandwidth.

$E_b/N_o$ is the link signal-to-noise ratio defined in a bit rate bandwidth.

As shown in FIG. 8, for a clear weather situation (no rain fades) the probability density function, identified by arrow 90 remains at the nominal value $P_{nom}$. In response to a rain fade, the probability density function spreads out from its nominal value towards the TWT saturation point $P_{sat}$, but still remains considerably less than the saturation point.

Adding the ALPC response to intermodulation product power levels that result from the increase in power for the rain fade, the probability density function increases in the manner shown in curve 92.

In accordance with the present invention, by expressing $\hat{MF}_1$ and $\hat{MF}_2$ as functions of $P_{nom}$ and other satellite network parameters, the stability point $P_{stab}$ may be computed as $$P_{stab} = \hat{MF}_1 + P_{nom} = P_{sat} - OBO_{stab} \text{ [dB units]}.$$

In determining $\hat{MF}_1$, $\hat{MF}_2$ and $OBO_{stab}$, certain assumptions are made. The first is that all satellite communication links have identical $E_b/N_o$ requirements, although data rates and signals powers may be arbitrary. The intermodulation noise density from the satellite TWT is considered to be flat across the transponder bandwidth, as shown in FIGS. 2–4. A further assumption is that all terminal stations have identical gain to terminal noise temperature ratio values and that the signal output power of the travelling wave tube increases linearly with signal input power. In addition, the TWT intermodulation product output power is assumed to increase as the cube of the TWT signal input power, as shown by curve 46 in FIG. 5. Additionally, satellite TWT input thermal noise power is considered to be insignificant compared to its input signal power. Finally, the rain stressed link(s) exhibits the same signal-to-intermodulation product power ratio and signal-to-noise ratio as unstressed links after $MF_1$ has occurred This implies that all links participate equally during the $MF_2$ response cycle.

Using the above expressions, it will be recalled from the foregoing discussion and will be readily appreciated from the characteristic curves of FIG. 6 that network stability criteria may be defined as $(E_s/N_o)\text{max} > (E_s/N_o)\text{rqd} - \Delta Q$ and $MF_2 > 1$ (or 0 db) at $E_s/N_o)\text{max}$.

These expressions require that the peak value of signal-to-noise ratio versus multiplication factor curve must exceed the threshold value $(E_s/N_o)\text{rqd}$ minus the quantizer step size of the link quality monitor and this peak value must be reachable with positive increases in TWT power. These criteria provide the basis for the derivation of ALPC stability relationships in accordance with which the present invention operates to determine entry of links into the satellite network The derivation of these relationships is set forth below.

The effective noise at a (ground receiver) downlink earth terminal 13 (FIG. 1) is made up of two components, namely thermal noise (N) and intermodulation "noise" (I). The intermodulation noise results from the nonlinear character of the TWT in satellite transponder 12. The level of the intermodulation depends on the TWT operating point. In a digital network the usual figure of merit for downlink quality is the energy contrast ratio or the ratio of received energy per symbol ($E_s$) to the effective single-sided noise spectral density ($N_0$). This ratio is equivalent to the signal-to-noise ratio measured in a bandwidth equal to the symbol rate.

$$\frac{E_s}{N_o} = \frac{S}{I+N} = \frac{(S/I)(S/N)}{(S/I) + (S/N)} \quad (1)$$

where
S = signal power,
I = intermodulation power in symbol rate bandwidth, and
N = thermal noise power in symbol rate bandwidth.

The operation of an ALPC network is characterized by stress and response cycles as follows. A downlink terminal or group of downlink terminals experiences a reduction in $E_s/N_o$ in response, for example, to a rain fade and requests additional downlink power to restore $E_s/N_o$ to the desired level. As described above with reference to FIG. 3, this event may be termed the stress cycle. At the conclusion of the stress cycle, transponder signal power has been increased by a factor $MF_1$. Because of the higher signal power demanded from the transponder 12, intermodulation power goes up by a factor $MF_1^3$. The other downlink terminals detect a decrease in $E_s/N_o$ due to the decrease in S/I and request additional signal power by a factor $MF_2$ to compensate. This corresponds to the response cycle shown in FIG. 4, referenced previously. Stated in mathematical terms:

$$(S/I)_1 = (S/I)_0 MF_1^{-3} \quad (2)$$

$$(S/N)_1 = (S/N)_0 \quad (3)$$

$$(S/I)_2 = (S/I)_1 MF_2^{-2} = (S/I)_0 MF_1^{-3} MF_2^{-2} \quad (4)$$

$$(S/N)_2 = (S/N)_1 MF_2 = (S/N)_0 MF_2 \quad (5)$$

where the subscripts 0, 1 and 2 refer to quantities prior to stress, at the end of the stress cycle, and at the end of the response cycle, respectively. Strictly speaking, equations (2) through (5) apply only to downlink terminals which did not suffer the original stress and consequently do not see an increase in their signal power at the end of the stress cycle. If the fraction of downlink terminals being stressed is small or if the stress on each terminal is small, then these equations adequately reflect the behavior of the system At the end of the stress cycle, $$(E_s/N_o)_2 = \frac{(S/I)_2 (S/N)_2}{(S/I)_2 + (S/N)_2} = \quad (6)$$

$$\frac{(S/I)_0 MF_1^{-3} MF_2^{-2} (S/N)_0 MF_2}{(S/I)_0 MF_1^{-3} MF_2^{-2} + (S/N)_0 MF_2}$$

If $(E_s/N_o)_2 \geq (E_s/N_o)_0$, then a stable operating point has been achieved. If not, further ALPC cycles ensue until an acceptable $E_s/N_o$ is reached or until the TWT is driven into saturation. In the latter case the network locks up with the transponder saturated and with unacceptable downlink performance for all terminals. This propensity for instability is attributable to the fact that beyond some TWT operating point, the effective $E_s/N_o$ on the ground is dominated by intermodulation from the satellite transponder 12 which increases more rapidly than signal power as the TWT output power is increased, i.e., when the signal power increases by a factor MF, the intermodulation power increases by a factor $MF^3$.

It is desirable in terms of network resources allocation and control to be able to predict the maximum stress $MF_1$ that can be tolerated without inducing instability. One way to solve this problem is to find the value of $MF_2$ which maximizes $(E_s/N_o)_2$ in equation (6) and then compare the maximum value to the desired value. If the maximum value falls below the required value, then the system is unstable for the assumed stress $MF_1$. The maximum $(E_s/N_o)_2$ can be found by differentiating equation (6) with respect to MF and setting the result to zero to find the value of $MF_2$ corresponding to the maximum $(E_s/N_o)_2$. The maximum tolerable $MF_1$ can then be found by equating the maximum $(E_s/N_o)_2$ to the required value and solving for $MF_1$.

Another, but entirely equivalent, mathematical development described below may be used. The minimum requirement for stability is that $E_s/N_o$ after the response cycle exactly equal that prior to the stress cycle.

$$\frac{(S/I)_0 (S/N)_0 MF_1^{-3} MF_2^{-1}}{(S/I)_0 MF_1^{-3} MF_2^{-2} + (S/N)_0 MF_2} = \frac{(S/I)_0 (S/N)_0}{(S/I)_0 + (S/N)_0} \quad (7)$$

Rearrangement and simplification of equation (7) leads to $$MF_2^3 - \frac{[(S/I)_0 + (S/N)_0]}{(S/N)_0 MF_1^3} MF_2 + \frac{(S/I)_0}{(S/N)_0 MF_1^3} = 0 \quad (8)$$

From equation (1) it can be seen that $$(S/N)_0 = \frac{(S/I)_0 \, (E_s/N_o)_0}{(S/I)_0 - (E_s/N_o)_0} \quad (9)$$

and equation (8) becomes $$MF_2^3 - \left[ \frac{(S/I)_0}{(E_s/N_o) \, MF_1^3} \right] MF_2 + \quad (10)$$

$$\frac{[(S/I)_0 - (E_s/N_o)_0]}{(E_s/N_o)_0 \, MF_1^3} = 0$$

Figure 9:
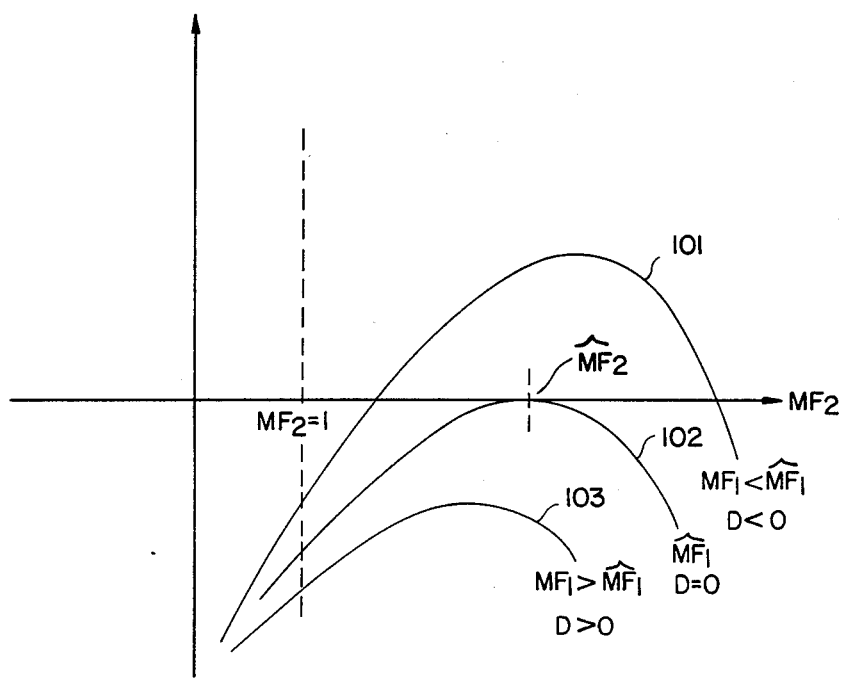
FIG. 9 shows a family of curves for signal-to-noise ratio differential vs. multiplication factor.

If for a given initial condition described by $(S/I)_o$ and $(E_s/N_o)_o$, and a stress $MF_1$, equation (10) has a meaningful solution for $MF_2$, then equation (7) is satisfied and a stable response to $MF_1$ exists. In the ALPC context a meaningful solution for $MF_2$ is one that is real and has a value greater than unity. The stability equation and its roots, which of course are also the roots of equation (7), can be visualized by referring to FIG. 9 which shows a family of curves for the relationship between $(E_s/N_o)_2 - (E_s/N_o)_o$ and $MF_2$. Three cases are illustrated.

Upper curve shows 101 two real roots greater than unity. It is known that there can be only two such real roots, because once the slope of the curve reverses, further increases in $MF_2$ lead only to smaller values of $(E_s/N_o)_2$. The other real roots must therefore have a value less than unity and can be discarded. Middle curve 102 shows the two real roots greater than unity merging to a single point. The remaining real root must again be less than unity The lower curve 103 has no real roots greater than unity. There is one real root less than unity and the other two roots are complex.

From the viewpoint of stability, upper curve 101 represents a stable system, lower curve 103 an unstable system and middle curve 102 is precisely the demarcation between stability and instability. Therefore, the limits of stability can be explored by examining the roots of equation (10), the stability equation.

The discriminant of a cubic equation of the form $$X^3 + aX + b = 0 \quad (11)$$

is $$D = \frac{b^2}{4} + \frac{a^3}{27} \quad (12)$$

When $D<0$ there are three real, unequal roots. When $D=0$ there are three real roots, at least two of which are equal. When $D>0$ there is one real root and a pair of complex conjugate roots.

In the stability equation above, $$a = \frac{-(S/I)_0}{(E_s/N_o)_0 \, MF_1^3} \quad (13)$$

$$b = \frac{[(S/I)_0 - (E_s/N_o)_0]}{(E_s/N_o)_0 \, MF_1^3} \quad (14)$$

A stress of $MF_1$ will evoke a stable response $MF_2$ as long as $$\frac{b^2}{4} + \frac{a^3}{27} \leq 0 \quad (15)$$

The transition from stability to instability is defined by $$\frac{b^2}{4} + \frac{a^3}{27} = \frac{[(S/I)_0 - (E_s/N_o)_0]^2}{4 \, (E_s N_o)_0^2 \, \hat{MF_1}^6} - \quad (16)$$

$$\frac{(S/I)_0^3}{27 \, (E_s/N_o)_0^3 \, \hat{MF_1}^9}$$

where $\wedge$ denotes critical values or values at the stability point. Solving equation (16) for $MF_1$ yields $$\hat{MF_1} = \frac{2}{3} \cdot \quad (17)$$

$$\left[ \frac{(S/I)_0 - (E_s/N_o)_0}{2(E_s/N_o)_0} \right]^{\frac{1}{2}} \left[ \frac{(S/I)_0}{(S/I)_0 - (E_s N/_o)_0} \right].$$

At the stability point, the repeated real root of the stability equation is $$\hat{MF_2} = (b/2)^{\frac{1}{3}} = \hat{MF_1}^{-1} \left[ \frac{(S/I)_0 - (E_s/N_o)_0}{2 \, (E_s/N_o)_0} \right]^{\frac{1}{2}} \quad (18)$$

$$= \frac{3}{2} \left[ \frac{(S/I)_0 - (E_s/N_o)_0}{(S/I)_0} \right]$$

In a practical system in which ALPC attenuator commands are quantized with a granularity $\Delta_Q$ db, it can be shown that the above results for $MF_1$ and $MF_2$ should be multiplied by $10(\Delta Q/10)$ and $10-(\Delta Q/10)$, respectively. Since $\Delta Q$ would typically be 0.1 dB or less, this represents a negligibly small change to the results and therefore is not included in the expression for and $\hat{MF_2}$ and $\hat{MF_1}$. Note that the stability equation can also be used to predict the response of the ALPC network to any subcritical stress. This is done by finding the smallest root of equation (10) greater than unity.

The operation point of a transponder TWT as expressed by output backoff (OBO) can be estimated from the signal-to-intermodulation ratio (S/I). Thus it is useful to know the S/I at the stability point.

$$(\hat{S/I})_2 = (S/I)_0 \, \hat{MF_1}^{-3} \, \hat{MF_2}^{-2} = \quad (19)$$

$$\hat{MF_2} \, (S/I)_0 \, (\hat{MF_1} \, \hat{MF_2})^{-3} =$$

$$\frac{3}{2} \left[ \frac{(S/I)_0 - (E_s/N_o)_0}{(S/I)_0} \right] (S/I)_0 \left[ \frac{2 \, (E_s/N_o)_0}{(S/I)_0 - (E_s/N_o)_0} \right] =$$

$$3 \, (E_s/N_o)_0$$

It will be recalled that S/I is the ratio of a downlink terminal's signal power to the intermodulation power in a bandwidth equal to the user's symbol rate. When estimating TWT operating point, however, what is needed is the ratio of total TWT signal output power to total intermodulation power in the transponder bandwidth. For example, a rule of thumb for TWT operating point is $$\frac{S_o}{\eta B_o} = K + 2\,(OBO)\ [dB] \qquad (20)$$

$S_o$ = total transponder signal power output
$\eta$ = transponder intermodulation power density
$B_o$ = transponder bandwidth
$K$ = constant related to particular TWT The transponder output power and bandwidth are divided among M terminals. Depending on the modulation type employed, a terminal occupied bandwidth may be greater than or less than the symbol rate. Furthermore, the transponder bandwidth may not be completely filled, e.g., guard bands might exist between channels.

Consider a uniform network in which all terminals have the same symbol rate and power requirements. Defining a bandwidth utilization factor $$y = R/B \qquad (21)$$

$R$ = user symbol rate
$B$ = bandwidth occupied per user,
Define a transponder factor $$\psi = \frac{MB}{B_o} \qquad (22)$$

$M$ = number of users
then $$\frac{S_o}{\eta B_o} = \frac{MS}{(MB/4)\eta} = \frac{S\psi}{(R/\gamma)\eta} \qquad (23)$$

$$\frac{S_o}{\eta B_o} = \left(\frac{S}{\eta R}\right)\omega\gamma = (S/I)\omega\gamma \qquad (24)$$

Equation (20) can now be used to determine TWT output backoff at stability, designated as $OBO_{STAB}$ in FIG. 8.

$$\widehat{OBO} = \tfrac{1}{2}[(\widehat{S/I})_2 - K + 10\log_{10}Y + 10\log_{10}\psi][dB] \qquad (25)$$

Using equation (19)

$$\widehat{OBO} = \tfrac{1}{2}[(E_s/N_0)_o + 4.8 - K + 10\log_{10}Y + 10\log_{10}\psi][dB] \qquad (26)$$

This is the desired result. It permits a determination of the TWT stability point as a function of the $(E_s/N_o)$ requirement, the modulation bandwidth utilization factor Y, and the transponder packing factor $\psi$, and is essential to the optimal TWT power allocation process to determine when to stop adding additional links to the network.

The description to follow will explain the optimal TWT power allocation procedure carried out in accordance with the present invention employing the above expression for determining TWT stability point.

For any practical satellite communication network, a prediction is made of the maximum stress $MF_1$ that does not result in network "lockup", namely satellite TWT saturation. This permits an initial allocation of TWT power among links of the network in such a way that a rain fade-induced increase in TWT operating point does not exceed the critical stress $MF_1$, with a probability of $P_a$. By choosing the probability $P_a$ to be equal to link availability requirements, it can be ensured that network stability considerations and rain fade margin considerations will equally constrain link availability. In other words, TWT rain margin $M_r$ required to provide an availability $P_a$ is computed and then the network is then sequentially loaded with additional lines and/or terminals until the rain margin $M_r$ is equal to the maximum or critical stress value $MF_1$. The result is an optimal initial TWT power allocation, in the sense that no other allocation procedure can result in higher data throughput rate and still meet link availability requirements. It is assumed that the control function employed intervenes as necessary to prevent lockup when the stress exceeds the critical stress value $MF_1$.

Figure 10:
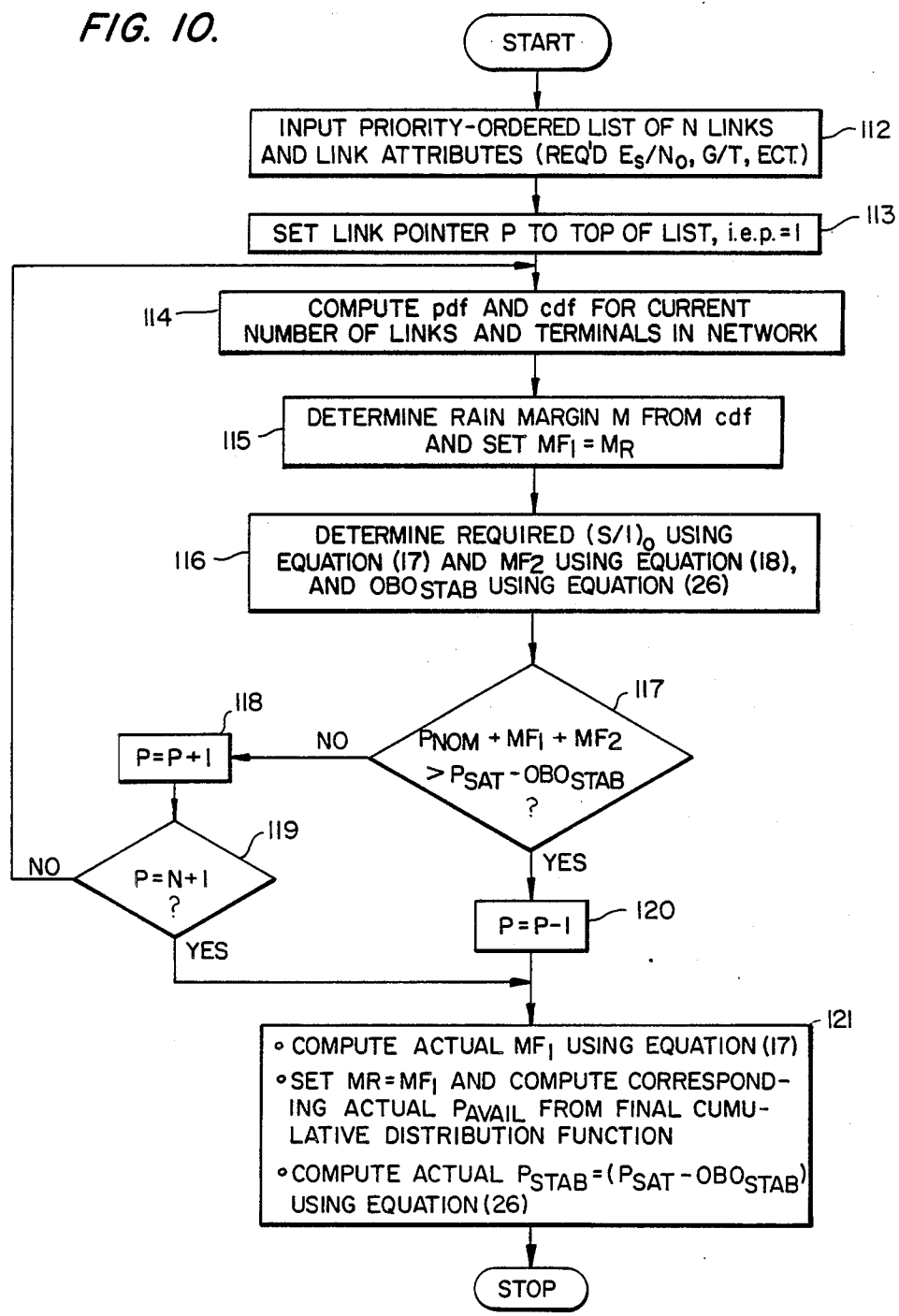
FIG. 10 is a flow chart of an optimal satellite TWT power allocation process.

Referring now to FIG. 10, there is shown a flow chart for carrying out the optimal TWT power allocation process in accordance with the present invention. For purposes of carrying out the steps of the flow chart shown in FIG. 10, the present invention employs a suitably programmed digital computer that is supplied with data values corresponding to hardware and operational characteristics of the components of the satellite network to be configured. For a potential end terminal link, characteristics of each of the end terminals (such $E_s/N_o$ required, G/T, etc.) are supplied as data inputs upon which the process operates (step 112). Each of the links is then listed in accordance with a priority order (step 113) and calculations are carried out for the first link to be added to the network. At the beginning of the process, the network has no links. For the first and each subsequent link to be added to the network, the corresponding TWT power output probability density function (PDF) is computed, as explained above. The resulting PDF is then integrated to obtain a TWT cumulative distribution function. These two operations are identified in the flow chart of FIG. 10 at step 114.

Using the cumulative distribution function, the rain margin required for a specified availability is determined and the adaptive link power control network stability margin $MF_1$ is set equal to the rain margin to ensure that both are equally constraining on network performance (step 115).

At the next step (step 116) the required quiescent (i.e. no rain) signal-to-intermodulation noise power ratio (S/I) is determined, using equation (17), which is then used to determine $MF_2$ using equation (18). Then, equation (26) is used to compute the OBO value corresponding to the stability point, $OBO_{STAB}$ in FIG. 8.

Once the above quantities have been computed, the stability of the network is ascertained at step 117 as follows. For the maximum rain fade $M = MF_1$ (a value not exceeded with probability $P_{AVAIL}$) and the resulting stress response $MF_2$, the corresponding maximum TWT operating point is $P_{nom} + MF_1 + MF_2$. If this operating point exceeds the critical value $P_{STAB} = P_{SAT} - OBO_{STAB}$, the network is unstable at the specified availability level and the current candidate link for admission to the network must *not* be admitted to the network.

In this event, the flow proceeds to step 120 whereat the number of participants in the link is reduced by one and the instability point is computed at step 121 and the process is then terminated. On the other hand, if the network is determined to be stable, the process proceeds to step 118 whereat P is increased by one. Step 119 then inquires whether or not the number of links examined thus far is equal to the total number of links sought to enter the network, as defined originally in step 112. Until the total number of links has been processed or the number of links processed creates a network instability condition at step 117, the flow proceeds back to step 114 and the above described computation sequence is repeated.

Once the maximum permissible number of links has been accommodated (either from the number N being reached or the network stability criterion being exceeded), the actual values of TWT stability point, rain margin and link availability are computed (step 121 referenced-above) and the allocation process terminates.

It should be observed that the rain margin $M_r$ required for a TWT common power pool will decrease as the number of terminals in the network increases. In addition, the required rain margin will increase if the probability of rain at each terminal increases.

As will be appreciated from the foregoing description, the satellite network TWT power allocation process according to the present invention provides a scheme whereby a satellite network may be configured in an optimal sense, namely minimized wasted TWT transponder power without reaching saturation or system lockup. Rather than provide an excess of available transponder power which is unused most of the time for avoiding communication stresses (e.g. rain fades) the process according to the present invention allocates, on a one at a time basis, participation in the network from a standpoint of TWT operational stability. As each terminal is added to the network, the cumulative power requirement effects are analyzed. When the stability point of successful operation of the network is reached, additional entries are prohibited and the final configuration of the network is established. In this manner, sufficient power for accommodating rain fades at the prescribed level of system availability is provided but unnecessary excess power which would otherwise be wasted is not allocated to each terminal in the system.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use in an adaptive link power control (ALPC) satellite communications network wherein signals conveyed between transmitting and receiving terminals are amplified and relayed by a satellite amplifier device the power availability from which is controlled to meet the demands of the links of the network, a method of configuring said network to accommodate a maximum number of requesting-to-be-participant links while maintaining network stability of said satellite amplifier device at a prescribed availability, comprising the steps of:
   (a) incorporating into the satellite network an individual one of said requesting-to-be-participant links of which the network is to be configured;
   (b) determining the power output probability density function of said satellite amplifier device as a result of the incorporation of said individual one of said links into said network and integrating the resulting probability density function to obtain a cumulative distribution function for said amplifier device;
   (c) establishing a rain margin power to be made available by said amplifier device in accordance with the cumulative distribution function obtained in step (b);
   (d) setting the ALPC network stability margin equal to the rain margin established in step (c);
   (e) defining a stability operating point of said amplifier device relative to a prescribed operational point of said amplifier device (d); and
   (f) selectively retaining in said network said individual one of said links that has been incorporated into said network in step (a), in accordance with whether or not the actual peak operating point of said amplifier device for the total number of links of said network including said incorporated link exceeds said stability operating point of said amplifier device.

2. A method according to claim 1, wherein said prescribed operation point of said amplifier device corresponds to the output saturation point of said amplifier device.

3. A method according to claim 2, wherein said amplifier device comprises a travelling wave tube amplifier.

4. A method according to claim 1, further including the step of:
   (g) in response to the actual peak operating point of said amplifier device for the total number of links of said network including said incorporated link not exceeding said stability operating point of said amplifier device, incorporating into the satellite network additional requesting participant links, on a one at a time basis, and for each respective additional requesting participant link, carrying out steps (a)–(f).

5. For use in an adaptive link power control (ALPC) satellite communications network wherein signals conveyed between transmitting and receiving terminals are amplified and relayed by a satellite amplifier device the signal amplification operation of which is controlled to meet the demands of the links of the network, a method of configuring said network to accommodate as many requesting-to-be-participant links as possible while maintaining operational signal amplification stability of said satellite amplifier device, comprising the steps of:
   (a) incorporating into the satellite network an individual one of said requesting-to-be-participants links of which the network is to be configured;
   (b) determining a prescribed network availability value of said satellite amplifier device as a result of the incorporation of said individual one of said links into said network and obtaining therefrom a cumulative representation of said prescribed network availability value of said satellite amplifier device;
   (c) establishing a predetermined degree of signal amplification capacity to be made available by said amplifier device in accordance with said cumulative representation obtained in step (b);
   (d) defining a preestablished ALPC network operational factor in accordance with the predetermined degree of signal amplification capacity established in step (c);
   (e) defining a preselected operating point of said amplifier device relative to a prescribed operating point of said amplifier device (d); and
   (f) selectively retaining in said network said individual one of said links that has been incorporated into said network in step (a), in accordance with whether or not the actual peak operating point of said amplifier device for the total number of links of said network including said incorporated link exceeds said preselected operating point of said amplifier device.

6. A method according to claim 5, further including the step of:

(g) in response to the actual peak operating point of said amplifier device for the total number of links of said network including said incorporated link not exceeding said preselected operating point of said amplifier device, incorporating into the satellite network additional requesting to be participant links, on a one at a time basis and, for each respective additional requesting-to-be-participant link, carrying out steps (a)–(f).

7. A method according to claim 6, wherein said satellite amplifier device comprises a travelling wave tube amplifier.

8. A method according to claim 7, wherein said network availability value of said satellite amplifier device corresponds to the power output probability density function of said satellite amplifier device.

9. A method according to claim 8, wherein said cumulative representation corresponds to a cumulative probability distribution function for said satellite amplifier device.

10. A method according to claim 9, wherein said predetermined degree of signal amplification capacity corresponds to a prescribed degree of signal transmission impairment.

11. A method according to claim 9, wherein said predetermined degree of signal amplification capacity corresponds to the rain margin power to be made available by said amplifier device.

12. A method according to claim 11 wherein said preestablished ALPC network operational factor corresponds to the ALPC network stability margin.

13. A method according to claim 12, wherein step (d) comprises equating the ALPC network stability margin with the rain margin defined in step (c).

14. A method according to claim 13, wherein said preselected operating point of said amplifier device corresponds to its stability operating point.

15. A method according to claim 14, wherein the prescribed operating point of said amplifier device corresponds to the output saturation point of said amplifier device.

* * * * *